(12) United States Patent
Kondoh et al.

(10) Patent No.: US 6,229,257 B1
(45) Date of Patent: May 8, 2001

(54) FLUORESCENT LAMP SEALED WITH GLASS BEAD

(75) Inventors: Toshifumi Kondoh; Yutaka Koyamada, both of Osaka; Hisatoshi Uchiyama, Kyoto, all of (JP)

(73) Assignee: Matsushita Electronics Corporation, Osaka (JP)

(*) Notice: Subject to any disclaimer, the term of this patent is extended or adjusted under 35 U.S.C. 154(b) by 0 days.

(21) Appl. No.: 09/203,539

(22) Filed: Dec. 2, 1998

(30) Foreign Application Priority Data

Dec. 5, 1997 (JP) .................................... 9-335848

(51) Int. Cl.$^7$ ................. H01J 1/62; H01J 5/50
(52) U.S. Cl. ............ 313/493; 313/318.01; 313/331; 313/623; 501/15; 439/232
(58) Field of Search ................. 313/493, 634, 313/485, 490, 491, 635, 332, 331, 623, 318.01; 439/232, 15, 61

(56) References Cited

U.S. PATENT DOCUMENTS

| | | | |
|---|---|---|---|
| 3,723,790 | * | 3/1973 | Dumbaugh, Jr. et al. ........... 313/578 |
| 4,326,146 | * | 4/1982 | Plagge et al. ..................... 313/623 |
| 5,459,110 | | 10/1995 | Brix . |
| 5,686,788 | * | 11/1997 | Lauter .............................. 313/490 |

FOREIGN PATENT DOCUMENTS

| | | |
|---|---|---|
| 42 30 607 | 1/1994 | (DE) . |
| 0 603 933 | 6/1994 | (EP) . |
| 1101905 | 2/1968 | (GB) . |
| 2 308 226 | 6/1997 | (GB) . |
| 36-28076 | 10/1961 | (JP) . |
| 37-13533 | 6/1962 | (JP) . |
| 48-30691 | 9/1973 | (JP) . |
| 57-123630 | 8/1982 | (JP) . |
| 57-174845 | 10/1982 | (JP) . |
| 59-79955 | 5/1984 | (JP) . |
| 59-128732 | 7/1984 | (JP) . |
| 59-128733 | 7/1984 | (JP) . |
| 60-10553 | 1/1985 | (JP) . |
| 63-198230 | 8/1988 | (JP) . |
| 1-166439 | 6/1989 | (JP) . |
| 1-239037 | 9/1989 | (JP) . |
| 2-99559 | 8/1990 | (JP) . |
| 5-89838 | 4/1993 | (JP) . |
| 6-206737 | 7/1994 | (JP) . |
| 9-283084 | 10/1997 | (JP) . |
| 957320 | 9/1982 | (SU) . |

OTHER PUBLICATIONS

Mar. 16, 1999, Communication from European Patent Office and attached Search Report.

\* cited by examiner

Primary Examiner—Nimeshkumar D. Patel
Assistant Examiner—Joseph Williams
(74) Attorney, Agent, or Firm—Merchant & Gould P.C.

(57) ABSTRACT

A fluorescent lamp includes a glass bulb whose inner surface is coated with a fluorescent substance, a glass bead attached to an end of the glass bulb so as to seal the glass bulb, an exhaust tube provided in the glass bead and sealed, a filament coil arranged in an internal portion of the glass bulb, and an electrode terminal member electrically connected to the filament coil. The glass bead controls a position of the electrode terminal member. The glass bulb preferably contains 5 to 10 wt % of $Na_2O$. The glass bulb, the glass bead and the exhaust tube preferably have a lead-free composition.

9 Claims, 5 Drawing Sheets

PRIOR ART

FIG. 5

FLUORESCENT LAMP SEALED WITH GLASS BEAD

BACKGROUND OF THE INVENTION

1. Field of the Invention

The present invention relates to a fluorescent lamp. More specifically, the present invention relates to a fluorescent lamp having a reduced adverse effect on the environment by improving the glass bulb material and the arrangement to provide an electrode to the fluorescent lamp.

2. Description of the Prior Art

Figure 5:
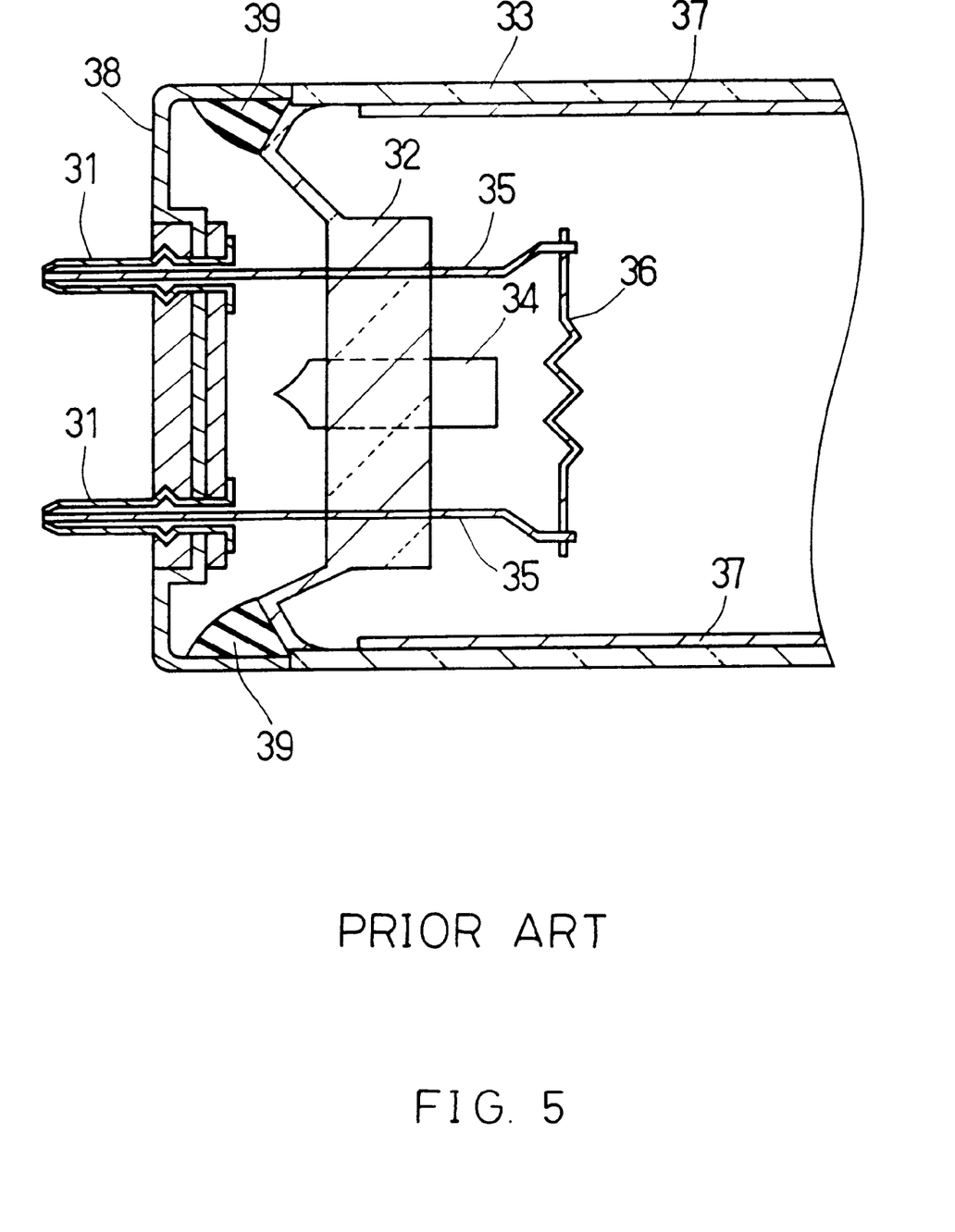
FIG. 5 is a partial cross-sectional view of a conventional fluorescent lamp.

A fluorescent lamp generally has the following configuration. As shown in FIG. 5, a conventional fluorescent lamp includes a cylindrical glass bulb 33 whose inner surface is coated with a fluorescent substance 37. The glass bulb 33 is sealed with stems at both ends of the glass bulb 33 (FIG. 5 shows only one end of the glass bulb 33). The stem includes a flare 32, an exhaust tube 34, lead wires 35 and a filament coil 36. The two lead wires 35 are connected to the ends of the filament coil 36. The glass bulb is evacuated to a vacuum, and mercury and a rare gas are injected through the exhaust tube. Then, the exhaust tube 34 is sealed. A lamp base 38 is attached to the end of the glass bulb 33 with cement 39. The lead wires 35 are connected to electrodes terminal pins 31 provided in the lamp base 38.

The glass bulb 33 is formed of a soda-lime glass comprising 10 to 20 wt % of sodium oxide because of its low cost and easy processing. Generally, lead glass containing 4 to 28 wt % of lead oxide is used as a glass material for the stem including the exhaust tube and the flare because it is handled easily in a heating process. Furthermore, the lamp base 38 is formed of aluminum or plastic such as polycarbonate. The cement 39 is formed by using an organic solvent such as phenol.

On the other hand, great attention has been given to environmental issues recently. In response to this tendency, in the field of fluorescent lamps, various efforts to reduce adverse effects on the environment have been undertaken. Recycling of waste lamps, reduction of environmental contaminants and upgrading of the workplace are examples of such efforts.

A variety of approaches have been proposed to pursue recycling of fluorescent lamps so that mercury, soda-lime glass and lead glass can be reused by a recycling treatment. However, there still remains a problem in sorting glass by type, so that the glass materials have not completely been reused yet. As for lamp bases, the cost of recycling is unattractively high, and therefore, waste lamp bases are buried in the earth at present.

The most problematic contaminants are mercury and lead. To tackle problems of mercury, a method for sealing up mercury has been changed. More specifically, a liquid mercury was sealed up by dropping before, whereas other methods associated with use of capsules, alloy, or amalgam are used at present. Thus, the amount of mercury contained is reduced, and the workplace is improved.

However, mercury is contained in a lamp in an amount larger than the amount theoretically necessary for the fluorescent lamp to light.

A larger amount of mercury is necessary partly because mercury is consumed by soda-lime glass generally used for a glass bulb. When the lamp including a glass bulb formed of soda-lime glass lights on, sodium ions in the soda-lime glass diffuse to the surface of the glass bulb while the lamp is on. The diffused sodium ions react with mercury vapor. Alternatively, mercury is fixed to voids formed as a result of the diffusion of sodium ions. Such mercury no longer contributes to discharge. These phenomena consume mercury, and therefore a superfluous amount of mercury, which is larger than an amount necessary for the glow of the lamp, is required to be sealed up in the lamp.

As for lead, a variety of glasses that contain less lead or do not contain lead have been proposed. However, any proposed glasses have drawbacks in their characteristics. Therefore, a glass containing a large amount of lead oxide is still used at present. When the glass containing a large amount of lead oxide is heated at a high temperature during the production steps for a lamp, toxic lead oxide is scattered and evaporated into the air. This fact may cause a large adverse effect on the workers or the environment. Therefore, a large financial investment is required to counter these problems so that the adverse effect on the workers or the environment can be reduced.

As described above, the lamp base and the lead glass in the conventional fluorescent lamp cause environmental problems. More specifically, the lamp base is buried in the earth after the lamp is disposed of. The lead glass releases toxic lead oxide, which requires a large financial investment to prevent this problem. In addition, the lead glass is hardly recycled. Furthermore, the use of soda-lime glass for a fluorescent lamp prevents a reduction of the amount of mercury to be sealed up in the fluorescent lamp.

SUMMARY OF THE INVENTION

Therefore, with the foregoing in mind, it is the object of the present invention to provide a fluorescent lamp that can reduce an adverse effect on the environment (i.e., facilitate recycling and reduce environmental contaminants) by forming a glass bulb with a material that allows a reduction of the amount of mercury contained and by not using a lamp base or lead glass.

A fluorescent lamp of the present invention includes a glass bulb whose inner surface is coated with a fluorescent substance, a glass bead attached to an end of the glass bulb so as to seal the glass bulb, an exhaust tube provided in the glass bead and sealed, a filament coil arranged in an internal portion of the glass bulb, and an electrode terminal member, e.g., an electrode terminal pin, electrically connected to the filament coil. The glass bead controls a position of the electrode terminal member. According to the fluorescent lamp of the present invention, the glass bead regulates the position of the electrode terminal member. Therefore, there is no need to provide a lamp base for regulating the position of the electrode terminal member. Thus, there is also no need to use a cement for attaching the lamp base to the glass bulb. In addition, this can eliminate the steps of connecting the lead wire to the lamp base member and attaching the lamp base to the glass bulb. Thus, the present invention provides a fluorescent lamp having advantages with respect to the environment and the cost during production of the fluorescent lamp.

In one embodiment of the fluorescent lamp of the present invention, the glass bulb and the glass bead preferably have substantially the same composition. This is preferable because the sealing property of the fluorescent lamp can be improved.

In another embodiment of the fluorescent lamp of the present invention, the glass bulb, the glass bead and the exhaust tube preferably have substantially the same composition. In this preferred embodiment, since the glass bulb, the glass bead and the exhaust tube have substantially the same composition, it is not necessary to sort glass by type in a recycling treatment. This facilitates recycling.

In still another embodiment of the fluorescent lamp of the present invention, the glass bulb, the glass bead and the exhaust tube preferably contain silica as a main component, and have a composition substantially free of lead.

In yet another embodiment of the fluorescent lamp of the present invention, the glass bulb preferably has a composition comprising:

65 to 73 wt % of $SiO_2$;
1 to 5 wt % of $Al_2O_3$;
0.5 to 2 wt % of $Li_2O$;
5 to 10 wt % of $Na_2O$;
3 to 7 wt % of $K_2O$;
0.5 to 2 wt % of MgO;
1 to 3 wt % of CaO;
1 to 10 wt % of SrO; and
1 to 15 wt % of BaO.

The composition according to this embodiment contains less sodium oxide than a glass composition for a conventional glass bulb. Therefore, it is possible to reduce the consumption of mercury in the glass bulb, thus leading to a reduction of the amount of mercury to be sealed in the fluorescent lamp.

In still another embodiment of the fluorescent lamp of the present invention, the glass bulb, the glass bead and the exhaust tube preferably have the above composition.

According to this preferred embodiment, a fluorescent lamp free from toxic lead can be produced.

The proportion of the components of the present invention is determined to be in the above-described range for the following reasons.

When $SiO_2$, which is an essential component for formation of glass, is contained in an amount of less than 65 wt %, the expansion coefficient becomes high, and chemical resistance deteriorates. Thus, a $SiO_2$ content less than 65 wt % is not preferable. When it exceeds 73 wt %, the expansion coefficient becomes excessively low, and therefore, the softening temperature becomes high, thus leading to a difficulty in molding. An $Al_2O_3$ content less than 1 wt % degrades the chemical resistance, and an $Al_2O_3$ content more than 5 wt % results in an inhomogeneous glass and more striae. Alkali metal oxides such as $Li_2O$, $Na_2O$ and $K_2O$ are used to accelerate the melting of the glass and serve to reduce the viscosity of glass. When one of these alkali metal oxides is added, the electrical resistance is much lower than a necessary electrical resistance. However, when all of the three alkali metal oxides are used in a $Li_2O$ content of 0.5 to 2 wt %, an $Na_2O$ content of 5 to 10 wt %, and a $K_2O$ content of 3 to 7 wt %, a sufficiently high electrical resistance can be obtained. Alkaline-earth metal oxides such as MgO and CaO improve the electric insulation and the chemical resistance. However, a MgO content of less than 0.5 wt % or a CaO content of less than 1 wt % fails to provide these advantages. A MgO content of more than 2 wt % or a CaO content of more than 3 wt % is not preferable because the glass may become opaque. SrO improves the hardness and the chemical resistance of glass. However, a SrO content of less than 1 wt % fails to provide these advantages. A SrO content of more than 10 wt % increases the opacity. BaO serves to lower the softening temperature. However, a BaO content of less than 1 wt % fails to provide this advantage. A BaO content of more than 15 wt % increases the opacity. For these reasons, the preferred proportion of the components of the present invention is determined as above.

In another embodiment of the fluorescent lamp of the present invention, preferably, the glass bulb further contains 0 to 3 wt % of $B_2O_3$. By adding up to 3 wt % of $B_2O_3$ to the material for the glass bulb, the strength and the durability of the material can be improved. In addition, it is less likely that the glass becomes opaque. Thus, the strength of the fluorescent lamp without a lamp base can be compensated for, and the fluorescent lamp of the present invention can be produced effectively.

In still another embodiment of the fluorescent lamp of the present invention, preferably, the glass bulb further contains 0 to 2 wt % of $Sb_2O_3$. By adding up to 2 wt % of $Sb_2O_3$ to the material for the glass bulb, the clarity of the material can be improved.

In yet another embodiment of the fluorescent lamp of the present invention, preferably, the glass bulb further contains 0 to 0.05 wt % of $Fe_2O_3$. By adding up to 0.05 wt % of $Fe_2O_3$ to the material for the glass bulb, the radiation of ultraviolet rays from the fluorescent lamp can be suppressed.

In another embodiment of the fluorescent lamp of the present invention, the glass bead is preferably attached to the glass bulb so as to seal the glass bulb by pinching.

In still another embodiment of the fluorescent lamp of the present invention, preferably, the glass bead is flared. The flared glass bead is preferably attached to the glass bulb so as to seal the glass bulb by fusing.

In yet another embodiment of the fluorescent lamp of the present invention, the electrode terminal pin is preferably electrically connected to the filament coil via a lead wire. A joint between the electrode terminal member and the lead wire is preferably fused to the glass bead. At least a portion of the lead wire that is fused to the glass bead is preferably formed of a dumet (a Dumet wire). According to this preferred embodiment, the sealing of the glass bead and the electrode terminal member and the lead wire is strengthened, thus leading to a decrease in poor performance of the electrode terminals due to leakage.

In another embodiment of the fluorescent lamp of the present invention, the electrode terminal member is preferably formed of a metal wire.

In another embodiment of the fluorescent lamp of the present invention, the electrode terminal member is preferably an electrode terminal pin.

In still another embodiment of the fluorescent lamp of the present invention, a member for reinforcing the electrode terminal pin is preferably formed in the vicinity of the electrode terminal pin. According to this preferred embodiment, the strength of the electrode terminal pins can be improved, and therefore, the load on the electrode terminal pin can be reduced when they are mounted onto a socket of a lamp lighting apparatus. Thus, the provision of the reinforcing member prevents damage to the electrode terminal pin and a portion in the vicinity of the electrode terminal pin.

In yet another embodiment of the fluorescent lamp of the present invention, the member for reinforcing the electrode terminal pin is preferably formed of a biodegradable plastic. This preferred embodiment provides an advantage in a treatment for waste lamps, because a biodegradable reinforcing member causes a small adverse effect on the environment even if it is disposed of without a recycling treatment.

As described above, the present invention provides a fluorescent lamp that can reduce an adverse effect on the environment (i.e., facilitate recycling and reduce environmental contaminants) by forming a glass bulb with a material that allows a reduction of the amount of mercury contained and by not using a lamp base or lead glass.

These and other advantages of the present invention will become apparent to those skilled in the art upon reading and understanding the following detailed description with reference to the accompng figures.

DESCRIPTION OF THE PREFERRED EMBODIMENTS

Hereinafter, the present invention will be described by way of preferred embodiments with reference to the accompanying drawings.

Embodiment 1

Figure 1:
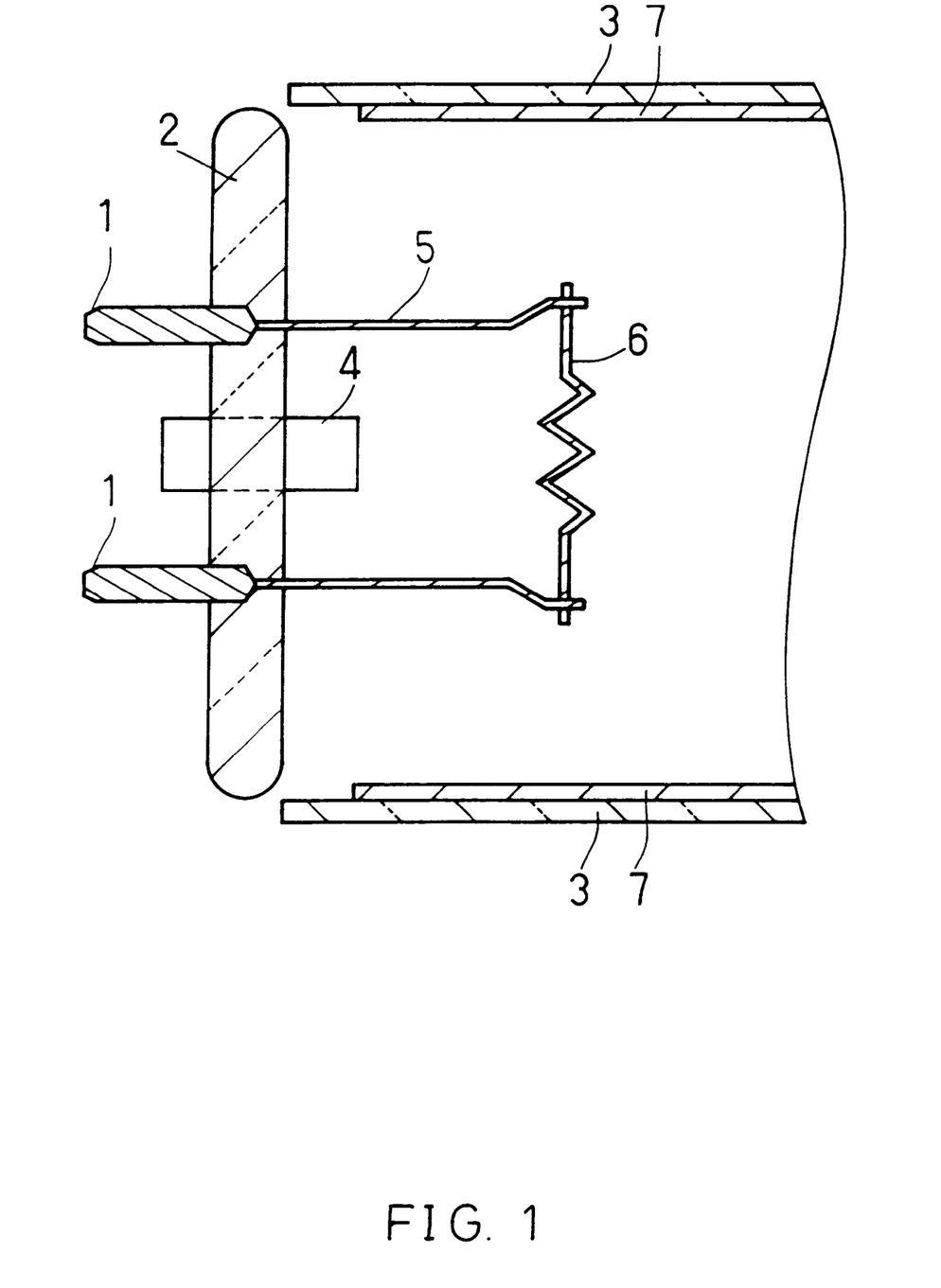
FIG. 1 is a partial cross-sectional view of a fluorescent lamp of a first embodiment of the present invention, before a glass bulb is sealed with a glass bead.
Figure 2A:
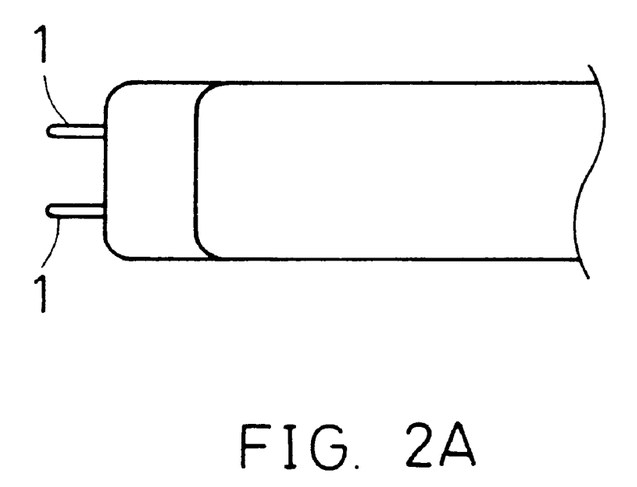
FIGS. 2A and 2B are partial side views of the fluorescent lamp of the first embodiment shown in FIG. 1 after the glass bead is attached to the glass bulb so as to seal the glass bulb by pinching.
Figure 2B:
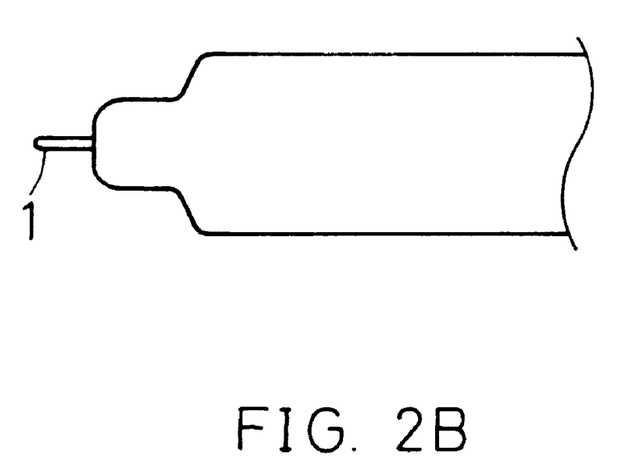

FIG. 1 is a schematic partial cross-sectional view showing a fluorescent lamp of Embodiment 1 according to the present invention. More specifically, FIG. 1 shows a schematic partial cross-sectional view of a fluorescent lamp of this embodiment before a glass bulb is sealed with a glass bead. FIGS. 2A and 2B are partial side views of the fluorescent lamp shown in FIG. 1 after the glass bead is attached to the glass bulb so as to seal the glass bulb by pinching. FIG. 2A is a front view, and FIG. 2B is a view when the fluorescent lamp of FIG. 2A is rotated by 90°. A method of "pinching" herein refers to a method of heating the end of the glass bulb and the glass bead to be softened, and applying pressure to the end of the glass bulb and the glass bead by a press-forming machine or the like, thereby attaching the glass bead to the end of the glass bulb.

As shown in FIGS. 1, 2A and 2B, in the fluorescent lamp of this embodiment, two electrode terminal pins 1 electrically connected to a filament coil 6 via lead wires 5 are fixed to a glass bead 2. A glass bead 2 is attached to the glass bulb 3 so as to seal the glass bulb 3 by pinching. A fluorescent substance 7 is applied onto an inner surface of the glass bulb 3. The glass bulb is evacuated to a vacuum, and mercury and a rare gas are injected through an exhaust tube 4. Then, the exhaust tube 4 is sealed. FIGS. 2A and 2B are side views of this fluorescent lamp.

In the fluorescent lamp of this embodiment, the electrode terminal pins 1 are fixed to predetermined positions of the glass bead 2. This eliminates the necessity of a lamp base, which is required to be provided in conventional fluorescent lamps for the purpose of regulating the positions of the electrode terminal pins. Thus, a cement, which is required for attaching the lamp base to the glass bulb, is no longer necessary. Furthermore, the steps of connecting lead wires to the lamp base pins and attaching the lamp base to the glass bulb can be eliminated. Therefore, this embodiment provides a fluorescent lamp having advantages in the environment and the cost for lamp production.

In Each of the glass bead 2, the glass bulb 3 and the exhaust tube 4 of the fluorescent lamp of the present invention preferably consists essentially of 65 to 73 wt % of $SiO_2$, 1 to 5 wt % of $Al_2O_3$, 0 to 3 wt % of $B_2O_3$, 0.5 to 2 of $Li_2O$, 5 to 10 wt % of $Na_2O$, 3 to 7 wt % of $K_2O$, 0.5 to 2 wt % of MgO, 1 to 3 wt % of CaO, 1 to 10 wt % of SrO, 1 to 15 wt % of BaO, 0 to 2 wt % of $Sb_2O_3$, and 0 to 0.05 wt % of $Fe_2O_3$.

In this embodiment, when the glass bead 2, the glass bulb 3 and the exhaust tube 4 have the above-described composition, a fluorescent lamp that is free from toxic lead can be obtained. Furthermore, the composition according to this embodiment contains less sodium oxide than a glass composition for a conventional glass bulb. Therefore, it is possible to reduce the consumption of mercury in the glass bulb 3, thus leading to a reduction of the amount of mercury to be sealed up in the fluorescent lamp. Moreover, since the composition of the glass bulb 3 is the same as that of the glass bead 2, it is possible to improve the sealing between the glass bulb 3 and the glass bead 2. Furthermore, since the compositions of the glass bead 2, the glass bulb 3 and the exhaust tube 4 are the same, it is not necessary to sort glass by type in a recycling treatment, thus facilitating recycling.

The compositions are limited in the above-described range for the following reasons.

When $SiO_2$, which is an essential component for formation of glass, is contained in an amount of less than 65 wt %, the expansion coefficient becomes high, and chemical resistance deteriorates. Thus, a $SiO_2$ content less than 65 wt % is not preferable. When it exceeds 73 wt %, the expansion coefficient becomes excessively low, and therefore, the softening temperature becomes high, thus leading to a difficulty in molding. Thus, the $SiO_2$ content is preferably in the range from 65 to 73 wt %, as described above.

An $Al_2O_3$ content less than 1 wt % degrades the chemical resistance, and an $Al_2O_3$ content more than 5 wt % results in an inhomogeneous glass and more striae. Therefore, an $Al_2O_3$ content is preferably in the range from 1 to 5 wt %, as described above.

A small amount of $B_2O_3$ added at less than 3 wt % increases the strength and the durability, and reduces the opacity. A content of more than 3 wt % is not preferable because the expansion coefficient becomes too small. Therefore, the $B_2O_3$ content is preferably in the range from 0 to 3 wt %, as described above.

Alkali metal oxides such as $Li_2O$, $Na_2O$ and $K_2O$ are used to accelerate the melting of glass and to reduce the viscosity of glass. When one of these alkali metal oxides is added, the electrical resistance is much lower than a necessary electrical resistance. However, when all of the three alkali metal oxides are used in a $Li_2O$ content of 0.5 to 2 wt %, an $Na_2O$ content of 5 to 10 wt %, and a $K_2O$ content of 3 to 7 wt %, a sufficiently high electrical resistance can be obtained. Therefore, any one of the three alkali metal oxides is contained in an amount less than the lower limit as listed above, the softening temperature becomes too high. When it exceeds the upper limit, the electrical resistance becomes too low. Thus, the alkali metal oxides are preferably contained in the above-described range.

Alkaline-earth metal oxides such as MgO and CaO improve the electric insulation and the chemical resistance. However, a MgO content of less than 0.5 wt % or a CaO content of less than 1 wt % fails to provide these advantages. A MgO content of more than 2 wt % or a CaO content of more than 3 wt % is not preferable because the glass may become opaque. Therefore, the MgO content is preferably in the range from 0.5 to 2 wt %, and the CaO content is preferably in the range from 1 to 3 wt %, as described above.

SrO improves the hardness and the chemical resistance of glass. However, a SrO content of less than 1 wt % fails to provide these advantages. A SrO content of more than 10 wt % increases the opacity. Therefore, the SrO content is preferably in the range from 1 to 10 wt %, as described above.

BaO serves to lower the softening temperature. However, a BaO content of less than 1 wt % fails to provide this advantage. A BaO content of more than 15 wt % increases the opacity. Therefore, the BaO content is preferably in the range from 1 to 15 wt %, as described above.

$Sb_2O_3$ is used as a clarifier. When $Sb_2O_3$ is contained in an amount of 2 wt % or less, the clarity of the material can be improved. A $Sb_2O_3$ content of more than 2 wt % is not preferable because re-foaming or blackening may occur during a heating process. Therefore, the $Sb_2O_3$ content is preferably in the range from 0 to 2 wt %.

$Fe_2O_3$ has a property of absorbing ultraviolet rays, and serves to suppress the radiation of ultraviolet rays from the fluorescent lamp. For this reason, $Fe_2O_3$ can be added, if necessary. However, a $Fe_2O_3$ content of more than 0.05 wt % is not preferable because the glass may become colored. Therefore, the $Fe_2O_3$ content is preferably in the range from 0 to 0.05 wt %.

According to the fluorescent lamp of this embodiment as described above, the electrode terminal pins 1 can be fixed to predetermined positions in the lamp without a lamp base. In addition, the fluorescent lamp can be obtained without using lead glass. Furthermore, since the content of sodium oxide in the glass bulb is small, the amount of mercury to be sealed up in the lamp can be reduced. Therefore, the fluorescent lamp of this embodiment facilitates recycling and reduces environmental contaminants. Thus, a fluorescent lamp having a reduced adverse effect on the environment can be obtained.

Embodiment 2

Figure 3:
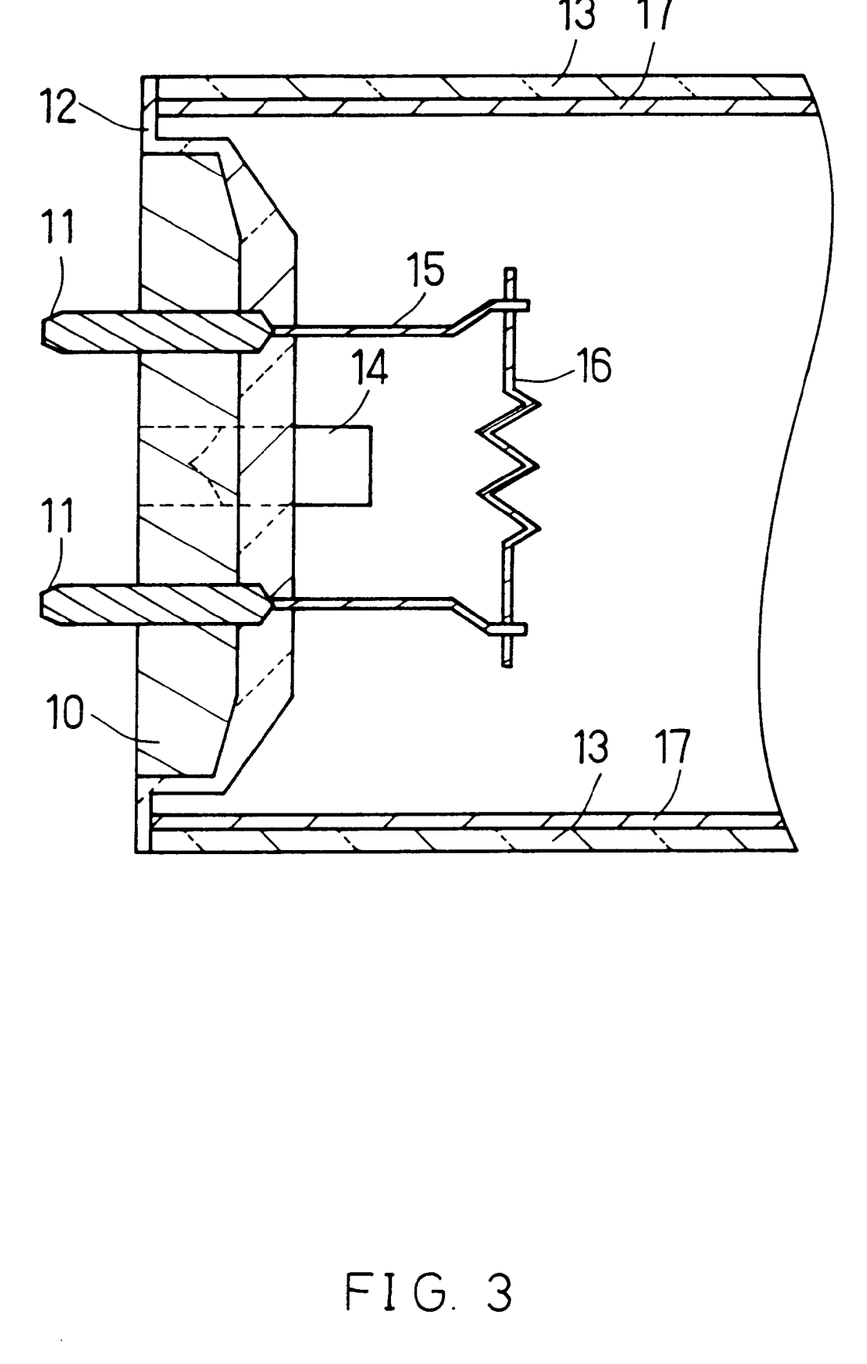
FIG. 3 is a partial cross-sectional view of a fluorescent lamp of a second embodiment of the present invention.

FIG. 3 is a schematic partial cross-sectional view of a fluorescent lamp of Embodiment 2 of the present invention. As shown in FIG. 3, the fluorescent lamp of this embodiment has the following configuration. A glass bead 12 provided with an exhaust tube 14 is flared. Two electrode terminal pins 11 electrically connected to a filament coil 16 via lead wires 15 are fixed to the glass bead 12. A glass bulb 13 whose inner surface is coated with a fluorescent substance 17 is sealed with the glass bead 12. The glass bulb is evacuated to a vacuum, and mercury and a rare gas are injected through the exhaust tube 14. The exhaust tube 14 is sealed thereafter.

In this embodiment, in order to increase the strength of the electrode terminal pins 11 when they are mounted onto a socket of a lamp lighting apparatus, a protector 10 for reinforcing the electrode terminal pins is provided outside the glass bead 12 (on the side of the electrode terminal pins 11). The protector 10 for reinforcing the electrode terminal pins is formed of, for example, plastic, glass, or ceramics. Furthermore, the protector 10 for reinforcing the electrode terminal pins is preferably formed of a substance having a small adverse effect on the environment, most preferably a biodegradable substance.

Each of the glass bead 12, the glass bulb 13 and the exhaust tube 14 of the fluorescent lamp of the present invention preferably consists essentially of 65 to 73 wt % of $SiO_2$, 1 to 5 wt % of $Al_2O_3$, 0 to 3 wt % of $B_2O_3$, 0.5 to 2 wt % of $Li_2O$, 5 to 10 wt % of $Na_2O$, 3 to 7 wt % of $K_2O$, 0.5 to 2 wt % of MgO, 1 to 3 wt % of CaO, 1 to 10 wt % of SrO, 1 to 15 wt % of BaO, 0 to 2 wt % of $Sb_2O_3$, and 0 to 0.05 wt % of $Fe_2O_3$. In order words, the glass bead 12, the glass bulb 13 and the exhaust tube 14 in Embodiment 2 are formed of the same composition as that of Embodiment 1.

The fluorescent lamp of Embodiment 2 has substantially the same configuration as that of Embodiment 1 in that the glass bead 12, the glass bulb 13 and the exhaust tube 14 are formed of the same composition as that of Embodiment 1. Therefore, the fluorescent lamp of Embodiment 2 can provide the same advantages as that of Embodiment 1. More specifically, the electrode terminal pins 11 can be fixed at predetermined positions in the lamp without a lamp base. In addition, the fluorescent lamp can be obtained without using lead glass. Furthermore, since the content of sodium oxide in the glass bulb is small, the amount of mercury to be sealed up in the lamp can be reduced. Thus, a fluorescent lamp having a reduced adverse effect on the environment (i.e., which can be recycled easily and reduce environmental contaminants) can be obtained.

Furthermore, the fluorescent lamp of this embodiment includes a protector 10. The protector 10 is fit into the flared glass bead 12 and reinforces the electrode terminal pins 11. This embodiment improves the strength of the electrode terminal pins 11. This makes it possible to reduce the load on the electrode terminal pins 11 when they are mounted onto a socket of a lamp lighting apparatus. Thus, the provision of the protector 10 prevents damage to the electrode terminal pins 11 and a portion in the vicinity of the electrode terminal pins 11.

Figure 4:
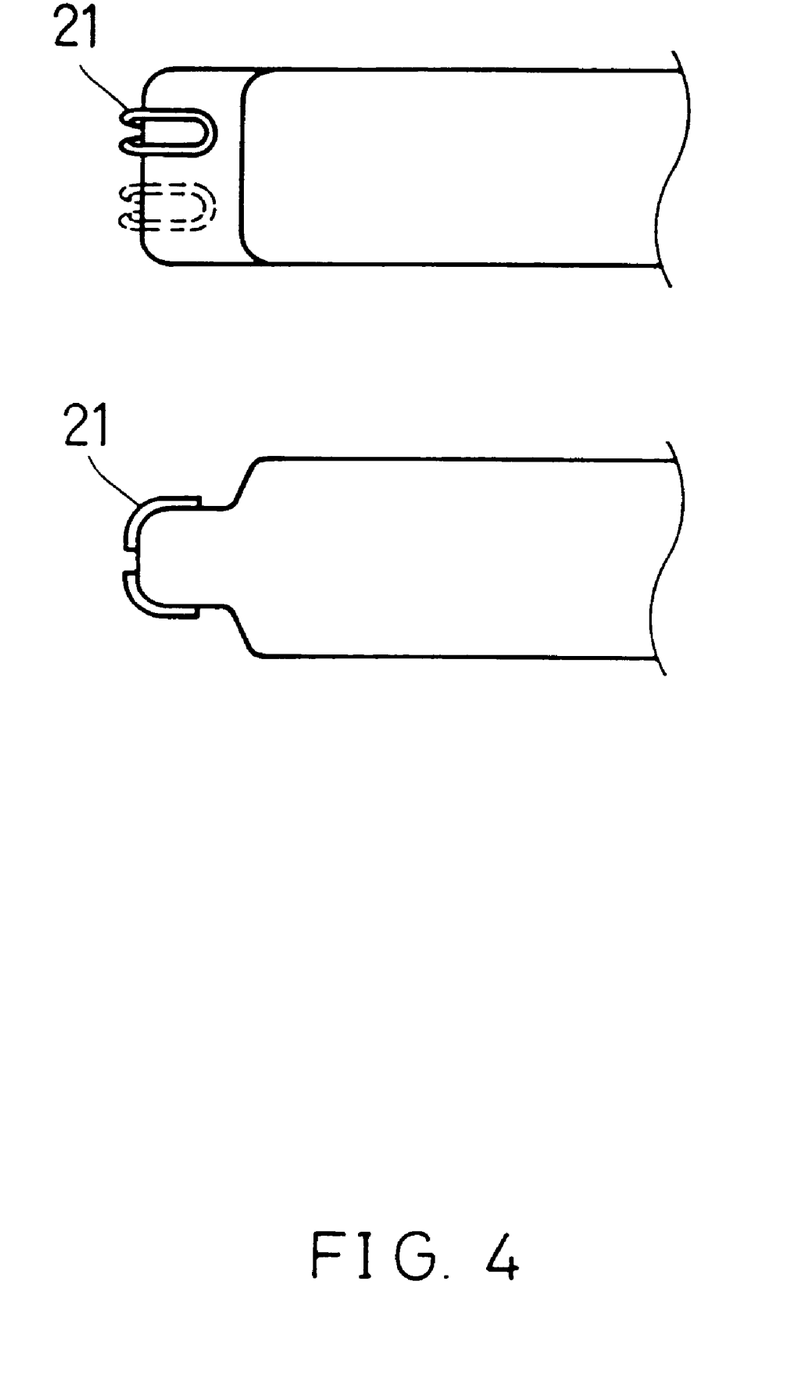
FIG. 4 is a partial side view of a fluorescent lamp according to another embodiment of the present invention.

Herein, the electrode terminal member refers to a portion on the side of the lamp that can be electrically conductive with a contact point of the socket of the lamp lighting apparatus. The shape thereof is not limited to the electrode terminal pins of the fluorescent lamps of Embodiments 1 and 2 (see FIGS. 1 to 3). For example, as shown in FIG. 4, a fine linear conductor 21 may be formed as electrode terminal member that constitutes the contact point on the side of the lamp. According to this embodiment, the conductor 21 can be the contact point that can be electrically conductive with the contact point of the socket, thus acting as the electrode terminal member.

In Embodiments 1 and 2, the positions at which the electrode terminal pins 1 and 11 are fixed refer to positions at which the connection with the socket of the lamp lighting apparatus can be established easily.

The electrode terminal pins 1 and 11 can be fixed at predetermined positions in the glass beads 2 and 12 by any methods. For example, holes slightly larger than the outer diameter of the electrode terminal pins 1 and 11 are provided in the predetermined positions of the glass beads 2 and 12. Then, the electrode terminal pins 1 and 11 are penetrated through the holes so as to support the electrode terminal pins 1 and 11. Then molten glass is injected in the inner portions of the holes, and the molten glass is solidified. Alternatively, the glass beads 2 and 12 are heated and softened, and then the electrode terminal pins are attached to the glass beads by pinching.

The electrode terminal pins 1 and 11 may be connected directly to the filament coil 6 and 16 by welding, pressing, winding or the like. Alternatively, the electrode terminal pins 1 and 11 may be connected to the filament coil 6 and 16 via the lead wires 5 and 15. In this case, the lead wires 5 and 15 may be connected to the electrode terminal pins 1 and 11 and the filament coil 6 and 16 by welding, pressing, winding or the like.

EXAMPLES

Hereinafter, the present invention will be described by way of examples.

Table 1 shows glass composition Examples of the present invention and glass composition Comparative Examples of the prior art.

TABLE 1

|  | Glass composition Example | | Glass composition Comparative Example | |
|---|---|---|---|---|
|  | 1 | 2 | 1 | 2 |
| Glass composition wt % | | | | |
| $SiO_2$ | 68.0 | 70.0 | 72.0 | 58.5 |
| $Al_2O_3$ | 3.4 | 2.0 | 1.7 | 1.0 |
| $B_2O_3$ |  | 2.0 |  |  |
| $Li_2O$ | 1.2 | 1.5 |  |  |
| $Na_2O$ | 7.4 | 6.5 | 16.0 | 8.3 |
| $K_2O$ | 5.0 | 5.0 | 1.1 | 4.0 |
| MgO | 1.8 | 1.0 | 2.7 |  |
| CaO | 1.9 | 2.0 | 5.6 |  |
| SrO | 2.85 | 6.0 |  |  |
| BaO | 8.7 | 1.1 |  | 0.5 |
| $Fe_2O_3$ | 0.05 |  |  |  |
| PbO |  |  |  | 27.7 |
| linear expansion coeffieient (0 to 300° C.) × $10^{-7}$/° C. | 93.0 | 94.0 | 99.0 | 94.0 |
| softening point ° C. | 675 | 682 | 692 | 615 |
| operation temperature ° C. | 990 | 985 | 1000 | 955 |

Glass composition Examples 1 and 2 are examples of glass compositions of the present invention. Glass composition Comparative Example 1 is a conventional example of a glass composition of soda-lime glass used for a glass bulb of a conventional fluorescent lamp. Furthermore, Glass composition Comparative Example 2 is a conventional example of a glass composition of lead glass used for a stem of a conventional fluorescent lamp.

The linear expansion coefficient is an average expansion coefficient between 0 to 300° C., and a value obtained by a measurement according to "a test method for the average expansion coefficient of glass" in Japanese Industrial Standards R 3102. The softening point is a value obtained by a measurement according to "a test method for the softening point of glass" in Japanese Industrial Standards R 3104. The operation temperature is a temperature corresponding to a viscosity of $10^3$ Pa·s, which is determined by a viscosity curve measured at a high temperature.

Next, a plurality of fluorescent lamps are produced with glass materials having the compositions shown in glass composition Examples 1 and 2 and glass composition Comparative Examples 1 and 2. The fluorescent lamps were produced in the following manner.

Example 1

A glass bulb, a glass bead and an exhaust tube were formed of a glass material of glass composition Example 1. Then, these members were used to produce a straight tube fluorescent lamp of 40 W with a configuration as shown in FIG. 1. Electrode terminal pins are electrically connected to a filament coil via lead wires formed of a Dumet wire. The lead wires were connected to the filament coil and the electrode terminal pins by welding. The electrode terminal pins were fixed to a glass bead so that the connection portions of the electrode terminal pins and the lead wires were fixed to the glass bead by pinching. Mercury was contained in an amount of 5.0mg in the form of amalgam.

Example 2

A glass bulb, a glass bead and an exhaust tube were formed of a glass material of glass composition Example 2. Then, a straight tube fluorescent lamp of 40 W with a configuration as shown in FIG. 1 was produced in the same manner as in Example 1, except that the glass bulb, the glass bead and the exhaust tube formed of the glass material of glass composition Example 2 were used.

Example 3

A glass bulb, a glass bead and an exhaust tube were formed of a glass material of glass composition Example 1. Then, a straight tube fluorescent lamp of 40 W with a configuration as shown in FIG. 3 was produced in the same manner as in Example 1, except that the fluorescent lamp had the configuration shown in FIG. 3.

Example 4

A straight tube fluorescent lamp of 40 W was produced in the same manner as in Example 1, except that the content of mercury was 1.0 mg.

Comparative Example 1

A glass bulb was formed of a glass material of glass composition Comparative Example 1. A glass bead and an exhaust tube were formed of a glass material of glass composition Comparative Example 2. Then, these members were used to produce a straight tube fluorescent lamp of 40 W with a configuration as shown in FIG. 5. The content of mercury was 5.0 mg.

Comparative Example 2

A straight tube fluorescent lamp of 40 W was produced in the same manner as in Comparative Example 1, except that the content of mercury was 1.0 mg.

Fifty fluorescent lamps for each of Examples 1 to 4 were produced. rn The fluorescent lamps of Examples 1 to 4 were produced easily, and no defects were produced. Moreover, none of the fluorescent lamps causes a problem when they are mounted onto a lamp lighting apparatus.

Next, the characteristics such as initial luminous flux and life of the fluorescent lamps of Examples 1 to 4 and Comparative Examples 1 and 2 were investigated. Table 2 shows the characteristics of the fluorescent lamps of Examples 1 to 4 and Comparative Examples 1 and 2. Five fluorescent lamps were prepared for investigation for each of Examples 1 to 4 and Comparative Examples 1 and 2, and the average value of the five fluorescent lamps is used to show the characteristics in Table 2. The luminous flux maintaining ratio in Table 2 refers to a ratio of a luminous flux at the point after 1000 or 2000 hours of life test to a luminous flux at the point after 100 hours of life test.

TABLE 2

|  |  | Example | | | | Com. Example | |
|---|---|---|---|---|---|---|---|
|  |  | 1 | 2 | 3 | 4 | 1 | 2 |
| Initial Luminous Flux [lm] |  | 3470 | 3480 | 3460 | 3450 | 3450 | 3460 |
| (Life test) Luminous Flux Maintaining Ratio [%] | 1000 h | 96.8 | 96.7 | 96.8 | 96.6 | 96.0 | 96.8 |
|  | 2000 h | 93.0 | 93.0 | 92.8 | 92.7 | 92.5 | * |

In Table 2, three lamps of the fluorescent lamps of Comparative Example 2 were off after 2000 hours of life test. Therefore, the luminous flux maintaining ratio was not obtained (shown by "*" in Table 2). The average value of the remaining two lamps that were still on was 92.6%.

As seen from Table 2, the fluorescent lamps of Examples 1 to 4 of the present invention have performance equal to or higher than the fluorescent lamps of Comparative Examples 1 and 2, and they have no flaws in the characteristics.

Furthermore, the content of mercury was 1.0 mg in Example 4 and Comparative Example 2. The fluorescent lamps of Example 4 of the present invention retained a sufficient lamp property at the point after 2000 hours of life test, whereas some of the fluorescent lamps of Comparative Example 2 were off at the point after 2000 hours of life test, apparently because of a shortage of mercury. This confirms that the fluorescent lamp of the present invention is effective for reducing the amount of mercury.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A fluorescent lamp comprising:

a glass bulb whose inner surface is coated with a fluorescent substance;

a glass bead attached to an end of the glass bulb so as to seal the glass bulb;

an exhaust tube provided in the glass bead and sealed;

a filament coil arranged in an internal portion of the glass bulb; and an electrode terminal member electrically connected to the filament coil, wherein the glass bead controls a position of the electrode terminal member, and further wherein, the glass bulb, the glass bead, and the exhaust tube have substantially the same composition, and further wherein, the glass bulb, the glass bead, and the exhaust tube contain silica as a main component, and have a composition substantially not containing lead, and further, the glass bulb has a composition comprising:
   65 to 73 wt % of $SiO_2$;
   1 to 5 wt % of $Al_2O_3$;
   0.5 to 2 wt % of $Li_2O$;
   5 to 10 wt % of $Na_2O$;
   3 to 7 wt % of $K_2O$;
   0.5 to 2 wt % of MgO;
   1 to 3 wt % of CaO;
   1 to 10 wt % of SrO;
   1 to 15 wt % of BaO;
   0 to 2 wt % of $Sb_2O_3$;
   0 to 0.05 wt % of $Fe_2O_3$; and
   $B_2O_3$, which is present in an amount no more than 3 wt %.

2. The fluorescent lamp according to claim 1, wherein the glass bead is attached to the glass bulb so as to seal the glass bulb by pinching.

3. The fluorescent lamp according to claim 1, wherein the glass bead is flared, and the glass bead is attached to the glass bulb so as to seal the glass bulb by fusing.

4. The fluorescent lamp according to claim 1, further comprising a lead wire, wherein the electrode terminal member is electrically connected to the filament coil via the lead wire.

5. The fluorescent lamp according to claim 4, wherein a joint between the electrode terminal member and the lead wire is fused to the glass bead, and at least a portion of the lead wire that is fused to the glass bead is formed of a Dumet wire.

6. The fluorescent lamp according to claim 1, wherein the electrode terminal member is formed of a metal wire.

7. The fluorescent lamp according to claim 1, wherein the electrode ruJ terminal member is an electrode terminal pin.

8. The fluorescent lamp according to claim 7, further comprising a member for reinforcing the electrode terminal pin.

9. The fluorescent lamp according to claim 8, wherein the member for reinforcing the electrode terminal member is formed of a biodegradable plastic.

* * * * *